Merle L. Morgan
INVENTOR.

BY [signature]
Agent

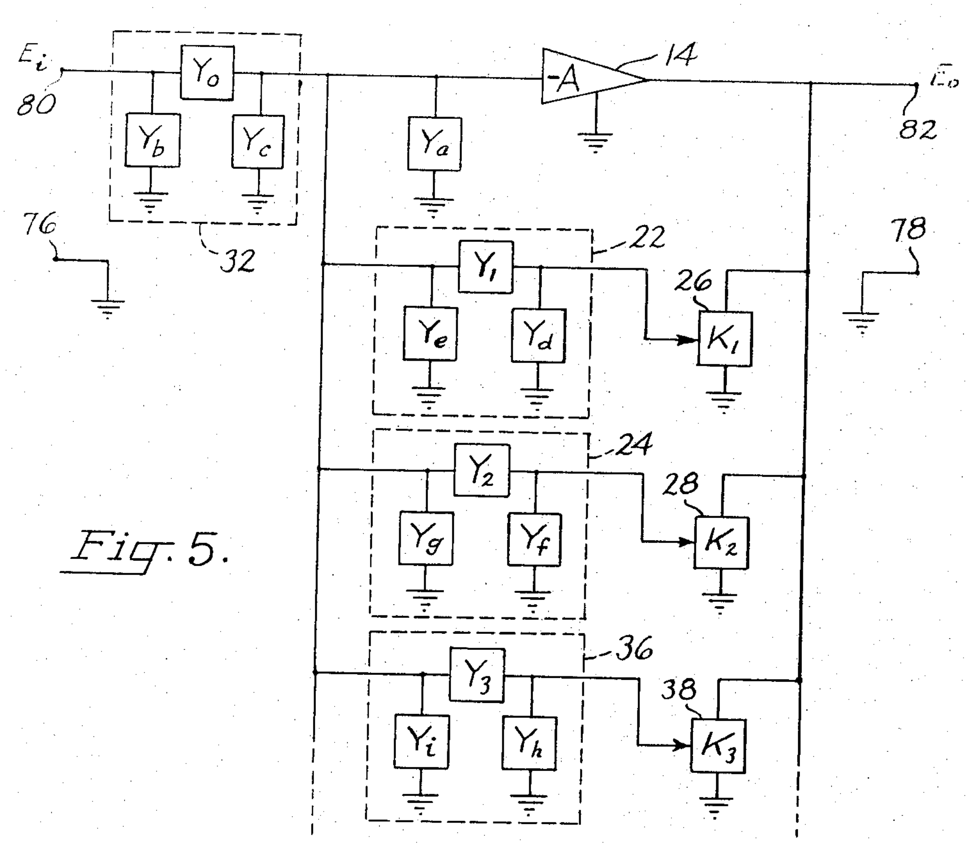
Fig. 5.
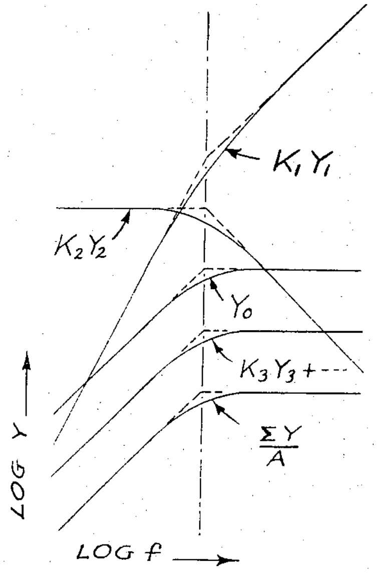
Fig. 6.
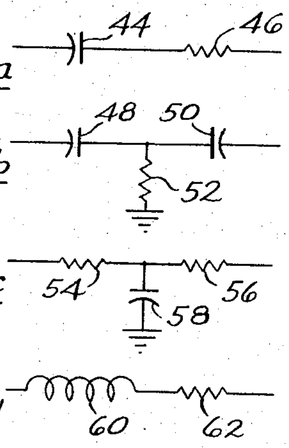
Fig. 7a
Fig. 7b
Fig. 7c
Fig. 7d
Merle L. Morgan
INVENTOR.
BY Oliver D. Olson
Agent Merle L. Morgan
INVENTOR.

BY Oliver D. Olson
Agent

United States Patent Office 3,356,962

Patented Dec. 5, 1967

3,356,962

FREQUENCY SELECTIVE AMPLIFIER-OSCILLATOR HAVING MULTIPLE FEEDBACK PATHS

Merle L. Morgan, Portland, Oreg., assignor to Electro Scientific Industries, Inc., Portland, Oreg., a corporation of Oregon Filed Apr. 10, 1964, Ser. No. 358,836

4 Claims. (Cl. 330—103)

This invention relates to electrical amplifiers of the feedback type, and more particularly to amplifiers having a narrow-band frequency selective response in which the frequency of maximum response is variable.

Since amplifiers of the foregoing type can be adjusted to produce steady-state sinusoidal oscillations, the present invention is properly referred to as an amplifier-oscillator.

In general, feedback amplifiers and oscillators of the prior art are characterized by certain disadvantages. In some the frequency of tuning is varied by changing the values of impedance elements in the frequency selective networks, by the ganging of a plurality of costly precision control devices. In many such amplifiers, adjustment of the frequency of tuning results in an inherent variation in maximum gain, or Q, or both, over the range of tuning. Some provide poor or variable rejection of frequencies away from the frequency of tuning. And some require complicated and costly non-linearly adjustable impedance elements or control therefor in order to accommodate a desired logarithmic frequency scale on the tuning dial. In this instance it is also difficult to gang a plurality together and achieve accurate tracking.

It is the principal object of the present invention to provide a frequency selective amplifier-oscillator circuit having simplified variable tuning means.

Another important object of this invention is the provision of a frequency selective amplifier-oscillator circuit in which the maximum gain and Q can be varied in a prescribed manner as the frequency of tuning is varied.

A further important object of the present invention is to provide a frequency selective amplifier-oscillator circuit having superior frequency response characteristics in that it can be adjusted so that its graph of log gain versus log frequency asymptotically approaches straight lines at frequencies above and below the frequency of tuning.

Another important object of this invention is the provision of a frequency selective amplifier-oscillator circuit of the class described in which changing of the frequency of tuning is accomplished by signal level adjusting means, thereby affording the use of fixed impedance elements in the frequency selective networks.

A further important object of this invention is the provision of a simplified differential attenuator having characteristics suitable for use as signal level adjusting means for accomplishing the above objectives.

A still further important object of the present invention is the provision of an attenuator in which a linear variation in the setting of a variable tapped resistor produces a substantially logarithmic variation in the frequency of tuning when the attenuator is used in the frequency selective amplifier-oscillator circuit of the present invention.

The foregoing and other objects and advantages of this invention will appear from the following detailed description, taken in connection with the accompanying drawings in which:

FIG. 1 is a block diagram illustrating schematically the signal flow paths of an amplifier-oscillator embodying the features of the present invention;

FIGS. 2*a*, 2*b* and 2*c* are graphs of curves of typical logarithmic frequency responses producible by the amplifier of the present invention, the dotted lines illustrating portions of frequency response curves characterizing amplifiers of the prior art;

FIG. 5 is a block diagram of a schematic electric circuit for the amplifier-oscillator of the present invention;

FIG. 6 is a set of graphs of illustrative logarithmic frequency characteristics for the frequency selective admittance elements of FIG. 5;

Figure 8A:
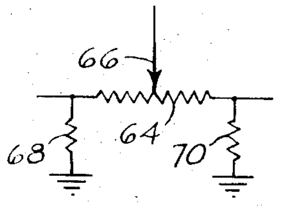
Figure 9A:
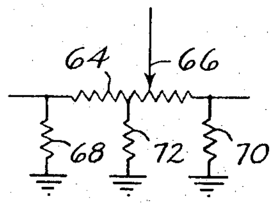
Figure 10A:
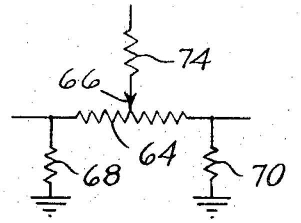
Figure 8B:
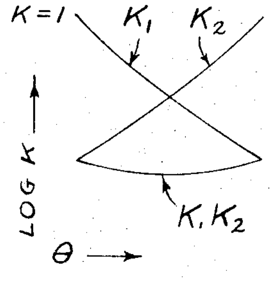
Figure 9B:
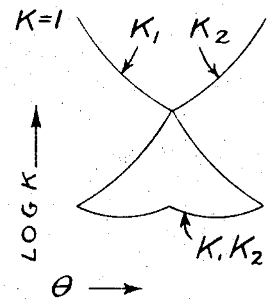
Figure 10B:
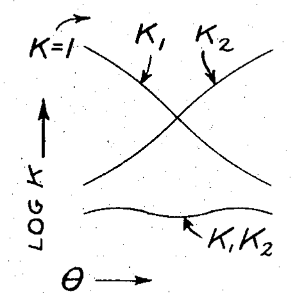
Figure 11:
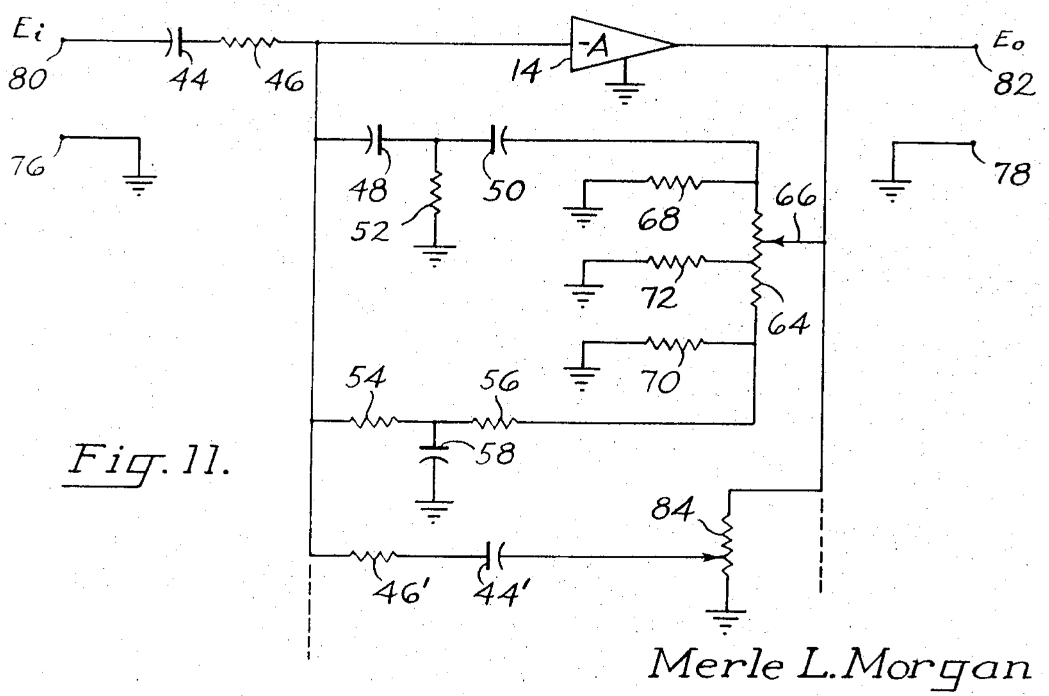

FIGS. 7*a*, 7*b*, 7*c* and 7*d* are schematic diagrams of electrical network circuits which are operable for the circuit of FIG. 5 and are characterized by the curves shown in FIG. 6;

FIG. 8*a* is a schematic diagram of one form of differential attenuator circuit operable in the circuit of FIG. 5, and FIG. 8*b* is a graph of the attenuation characteristic thereof;

FIG. 9*a* is a schematic diagram of a second form of differential attenuator circuit, and FIG. 9*b* is a graph of the attenuation characteristic thereof;

FIG. 10*a* is a schematic diagram of a third form of differential attenuator circuit, and FIG. 10*b* is a graph of the attenuation characteristic thereof; and FIG. 11 is a schematic diagram of one form of electrical circuit of the amplifier-oscillator of the present invention.

Figure 2A:
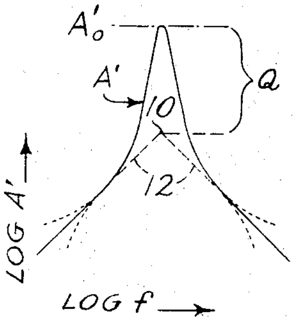
Figure 2B:
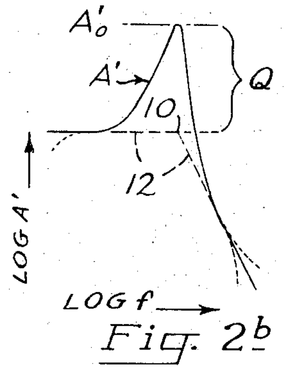
Figure 2C:
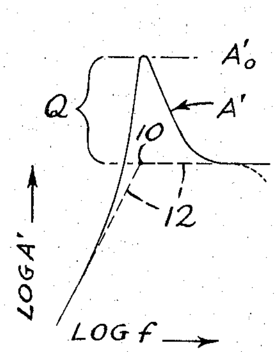

Referring first to FIGS. 2*a*, 2*b* and 2*c*, there are shown typical frequency response curves for frequency selective amplifiers. FIG. 2*a* illustrates a curve providing similar attenuation of high and low frequencies with respect to the frequency of tuning; FIG. 2*b* illustrates a curve providing greater attenuation of high frequencies; and FIG. 2*c* shows a curve providing greater attenuation of low frequencies.

The frequency response curves shown in solid lines in FIGS. 2*a*, 2*b* and 2*c* can be recognized as equivalent to those of simple tuned circuits containing inductance, resistance and capacitance. Frequency selective feedback amplifiers provided heretofore often differ in response from simple tuned circuits in the manner illustrated by the dotted lines in the aforementioned figures. An important feature of the amplifier circuit of the present invention is its ability to be adjusted to faithfully duplicate the response characteristics of simple tuned circuits for which the logarithmic response curves approach straight line asymptotes at frequencies above and below the frequency of maximum gain. The intersection 10 of these straight lines identifies the frequency of tuning, and it will be approximately equal to the frequency of maximum gain.

The sharpness of frequency selectively commonly is expressed in terms of bandwidth, relative bandwidth, or Q. Bandwidth usually is defined as the difference between the frequencies where the gain is 0.707 times the maximum gain. Relative bandwidth is defined as the ratio of the bandwidth to the frequency of tuning. Q is defined as the ratio of the gain at the frequency of tuning to the equivalent gain at the intersection 10 of the two asymptotes 12 on the logarithmic plot. Relative bandwidth is approximately equal to the reciprocal of Q for curves of relatively narrow bandwidth.

Figure 1:
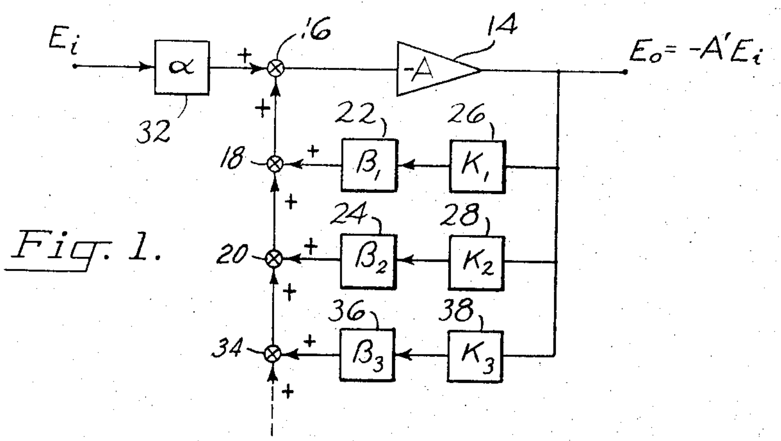

The basic concept of the present invention is illustrated in the signal flow diagram of FIG. 1. Thus, a basic amplifier 14 of conventional construction provides a gain —A. The input signal $E_i$ is connected to the basic amplifier input through the summing junction 16. The amplifier output signal $E_0$ is fed back to the amplifier input through a pair of main feedback paths and the summing junctions 18 and 20. At least one of the feedback paths includes signal modifying means. In the embodiment illustrated, both feedback paths include signal modifying means 22 and 24, respectively. These function to provide feedback signal modifications (magnitude and phase shift characteristics) which are described by the complex vector quantities $\beta_1$ and $\beta_2$, respectively, which are functions of frequency. These signal modifying means provide for shifting the phases of the signals in the feedback paths so as to have a phase difference of substantially 180°.

At least one of the feedback paths also includes signal level adjusting means. In the embodiment illustrated, both feedback paths include signal level adjusting means 26 and 28, respectively. These provide signal transmission factors described by the quantities $K_1$ and $K_2$ for establishing the feedback signal levels through the associated feedback paths, changing signal magnitudes essentially by the same factor at all frequencies without substantially changing the phase of the signals.

It is to be understood that the signal level adjusting means in the feedback paths may either precede or follow the signal modifying means, since the effect on the signal reaching the summing junction will be the same in either case.

The overall feedback amplifier gain A', defined as $-E_0/E_i$ can be written as $$A'=\frac{A}{1+A(K_1\beta_1+K_2\beta_2)} \qquad (1)$$

or the reciprocal form $$\frac{1}{A'}=K_1\beta_1+K_2\beta_2+\frac{1}{A} \qquad (2)$$

Figure 3:
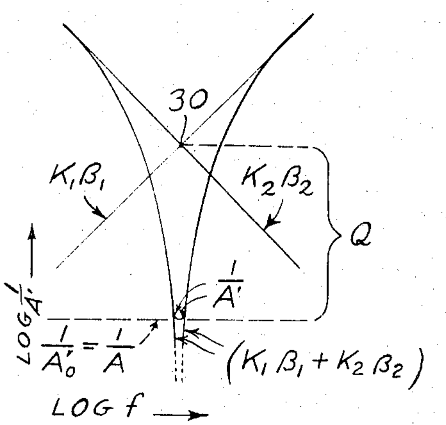
FIG. 3 is a graph of typical logarithmic frequency response curves for the signal paths and the resulting curve for the fundamental amplifier circuit of the present invention.

FIG. 3 shows plots of the foregoing reciprocal gain Equation 2 corresponding to the response shown in FIG. 2*a*. Since $\beta_1$ and $\beta_2$ are complex vector quantities differing by 180°, the vector sum at the frequency where the two curves intersect is $$K_1\beta_1+K_2\beta_2=O \qquad (3)$$

The gain at this frequency of tuning is herein called $A'_0$ and from the foregoing reciprocal Equation 2 it is seen that $$\frac{1}{A'_0}=\frac{1}{A} \qquad (4)$$

It is to be understood that the phase of the curve 1/A is typically approximately midway between the phase angles of $K_1\beta_1$ and $K_2\beta_2$ in order that the maximum value of A' will be substantially equal to $A'_0$. Therefore, in the immediate vicinity of the frequency of tuning, the value of A' is controlled primarily by the value of A.

At higher and lower frequencies the effect of 1/A becomes negligible and the approximate gain equation is:

$$\frac{1}{A'}\approx K_1\beta_1+K_2\beta_2 \qquad (5)$$

For example, in the logarithmic plot of FIG. 3 both the $K_1\beta_1$ and $K_2\beta_2$ curves are chosen to be straight lines over an extended frequency range in order that the resulting selectivity curves A' in FIGS. 2*a*, 2*b* and 2*c* will exhibit the improved frequency response characteristics in which the curves asymptotically approach straight lines above and below the frequency tuning. In FIG. 3 these lines have slopes of +1 and −1, respectively, to correspond with the curve of FIG. 2*a*. The phase shifts corresponding to these curves $K_1\beta_1$ and $K_2\beta_2$ for networks for the ordinary "minimum phase" type, will be a constant +90 and −90°, respectively, or a phase difference of 180° at all frequencies. Accordingly, at the point 30 where the two curves intersect, the two feedback signals are exactly equal and opposite and thus will cancel to produce a null at that frequency.

Assuming $1/A$ to be essentially constant with frequency, its phase shift is 0°. Since the $K_1\beta_1$ and $K_2\beta_2$ curves have phase shifts of +90 and −90°, the vector sum including $1/A$ will yield the $1/A'$ curve shown, and this corresponds to the desired type of curve for A' as shown in FIG. 2*a*.

If either the $K_1\beta_1$ curve or the $K_2\beta_2$ curve is raised or lowered, as by changing the amplification or attenuation by means of $K_1$ or $K_2$, the intersection point 30 will change its vertical and horizontal coordinates, sliding along the line which was not shifted. Thus, the null frequency will be shifted, changing the tuning of the amplifier and simultaneously producing a change in the Q of the amplifier.

However, if the $K_1\beta_1$ curve is lowered while simultaneously raising the $K_2\beta_2$ curve by the same amount, which corresponds to keeping the product $K_1K_2$ constant, the intersection point 30 will move horizontally and the sum of the curves will be the same response curve shifted left or right without changing its vertical position or shape, thereby maintaining Q constant.

By varying $K_1$ and $K_2$ simultaneously by different amounts, it is possible to vary Q in a prescribed manner as the frequency of tuning is varied.

In actual practice, the circuit which mixes the input signal $E_i$ with the feedback signals at the summing junction 16 may modify the frequency characteristics (magnitude and phase) of the input signal. Accordingly, the input circuit thus may contain the signal modifying means 32 (FIG. 1) in which the signal modification is described by the complex vector quantity $\alpha$.

Also, in actual practice, it may be desirable to control $A'_0$. Accordingly, the basic circuit of FIG. 1 may be modified to include at least one auxiliary feedback path, connected to the summing junction 34 and including the signal modifying means 36 in which the signal modification is described by the complex vector quantity $\beta_3$. It is to be understood that the term signal modifying means includes the case in which constant magnitude and zero phase shift are desired, for which $\beta$ is a real constant. This auxiliary feedback path also may include the signal level adjusting means 38 in which the signal transmission factor is described by the quantity $K_3$.

Accordingly, the overall feedback amplifier gain A' can be written in general as $$A'=\frac{A\alpha}{1+A(K_1\beta_1+K_2\beta_2+K_3\beta_3+\cdots)} \qquad (6)$$

or the reciprocal form $$\frac{1}{A'}=\frac{K_1\beta_1}{\alpha}+\frac{K_2\beta_2}{\alpha}+\frac{K_3\beta_3}{\alpha}+\cdots\frac{+1}{A\alpha} \qquad (7)$$

Hence, at the frequency of tuning $$\frac{1}{A'_0}=\frac{1}{A\alpha}+\frac{K_3\beta_3}{\alpha}+ \qquad (8)$$

It can be seen from the foregoing reciprocal Equation 8 that a prescribed curve $A'_0$ versus frequency of tuning (FIG. 4) can be obtained by suitable selection of $$\frac{K_3\beta_3}{\alpha}$$

Additionally, the prescribed curve may be moved vertically by varying $K_3$, thereby varying $A'_0$ and Q.

Figure 4:
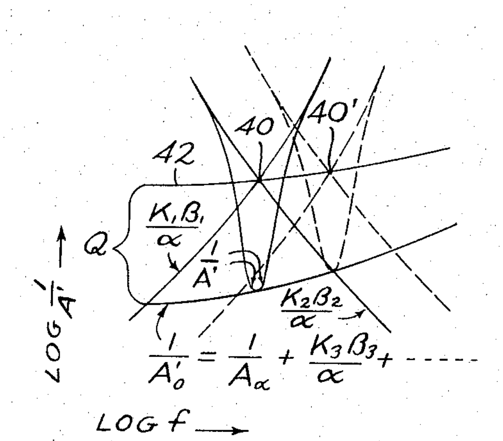
FIG. 4 is a similar graph of reciprocal response curves for the signal paths and the resulting curves for the overall response of a more general amplifier circuit of the present invention, and lines identifying the variations in maximum gain and Q obtainable in the amplifier circuit, the dash lines illustrating a shift in the curves as the frequency of tuning is varied.

In addition, prescribed values of Q versus frequency of tuning can be obtained by varying $K_1$ and $K_2$ simultaneously in such a manner that as the frequency of tuning is varied the intersection of the two curves $$\frac{K_1\beta_1}{\alpha}$$

and $$\frac{K_2\beta_2}{\alpha}$$

will always follow the prescribed line 42, as illustrated in FIG. 4.

Thus, the frequency response curve $1/A'$ shown in solid lines in FIG. 4 results from the intersection of the curves at the point 40, while the frequency response curve illustrated in dash lines is derived by the intersection of the two curves at the point 40'.

All of the lines in FIG. 4 are shown as curves, since it is not an essential requirement of the invention that they be straight lines if this is not desired. As long as $$\frac{K_1\beta_1}{\alpha}$$

and $$\frac{K_2\beta_2}{\alpha}$$

are such that their accompanying phase shifts differ by substantially 180° over the frequency range, their sum will always exhibit a null at the frequency of tuning, where they intersect, for all combinations of $K_1$ and $K_2$ which place the intersection 40 along any desired curve 42. The reciprocal gain $1/A'_0$ at the frequency of tuning will therefore always lie along the curve $$\frac{1}{A\alpha}+\frac{K_3\beta_3}{\alpha}+\dots$$

Furthermore, as long as the phase shift of $$\frac{1}{A\alpha}+\frac{K_3\beta_3}{\alpha}+\dots$$

is approximately midway between the phase angles of $$\frac{K_1\beta_1}{\alpha}$$

and $$\frac{K_2\beta_2}{\alpha}$$

the $1/A'$ curve will be approximately tangent to the curve $$\frac{1}{A\alpha}+\frac{K_3\beta_3}{\alpha}+\dots$$

an the frequency of tuning, as shown in FIG. 4.

The sum of two vectors not quite 180° apart is substantially the same as the sum of two vectors exactly 180° apart plus a smaller third vector at right angles to them. Therefore, the effect of a phase difference between the main feedback paths slightly different from 180° will be essentially the same as that of an amplifier containing main feedback paths differing by exactly 180° and an auxiliary feedback path having a value of K representing the departure from 180° phase difference in the main feedback paths. A positive value of K corresponds to an angle less than 180° and a negative value of K to an angle more than 180°. The value of K is proportional to the departure from 180° which it represents.

Thus, it is apparent that the phase difference between the main feedback paths can be adjusted slightly more or less than 180° to simulate the effect of an auxiliary feedback path without actually having such a feedback path. It is therefore understood as being within the scope of this invention that the adjustment of the phase difference between the main feedback paths, or the adjustment of positive or negative K in an auxiliary feedback path, may be treated interchangeably.

In actual practice it may be preferred for economy to avoid the requirement of maintaining an exact 180° phase difference between the main feedback paths, by providing an auxiliary path whose K may be adjusted to compensate for the imperfect adjustment of the main feedback paths.

Thus, regardless of the gain A of the basic amplifier, the adjustment of positive or negative K values in an auxiliary feedback path, or the adjustment of the phase difference between the main feedback paths, or a combination of both, can provide any desired value of gain $A'_0$ at the frequency of tuning.

This feature of adjustment makes it possible to adjust the value of $A'_0$ to infinity, in order to make the amplifier function as a sinusoidal oscillator. Another way of making the circuit function as an oscillator is by making the gain A infinite, by including internal positive feedback in the basic amplifier 14. In these cases the amplitude of oscillation may be stabilized by using an automatic gain control as the signal level adjusting means in an auxiliary feedback path.

Referring now to FIG. 5, the circuit diagram illustrates one form by which to achieve the signal flow conditions of FIG. 1. In FIG. 5 the admittance $Y_a$ represents the input admittance of the basic amplifier 14, both internal and external; the admittances $Y_0$, $Y_b$ and $Y_c$ represents the input signal modifying means 32; the admittances $Y_1$, $Y_d$ and $Y_e$ represent the signal modifying means 22; the admittances $Y_2$, $Y_f$ and $Y_g$ represent the signal modifying means 24; the admittances $Y_3$, $Y_h$ and $Y_i$ represent the signal modifying means 36; etc.

Relating FIG. 5 to FIG. 1:

$$\alpha=\frac{Y_0}{\sum Y}$$

$$K_1\beta_1=\frac{K_1Y_1}{\sum Y}$$

$$K_2\beta_2=\frac{K_2Y_2}{\sum Y}$$

$$K_3\beta_3=\frac{K_3Y_3}{\sum Y}$$

etc.

wherein $\Sigma Y$ is the total admittance connected to the basic amplifier input:

$$\Sigma Y=Y_0+Y_1+Y_2+Y_3+\dots+Y_a+Y_c+Y_e+Y_g+Y_i+\dots$$

Accordingly, the terms in the reciprocal Equation 7 will be $$\frac{K_1\beta_1}{\alpha}=\frac{K_1Y_1}{Y_0}$$

$$\frac{K_2\beta_2}{\alpha}=\frac{K_2Y_2}{Y_0}$$

$$\frac{K_3\beta_3}{\alpha}=\frac{K_3Y_3}{Y_0}$$

etc.

and $$\frac{1}{A\alpha}=\frac{\sum Y}{AY_0}$$

so that $$\frac{1}{A'}=\frac{K_1Y_1}{Y_0}+\frac{K_2Y_2}{Y_0}+\frac{K_3Y_3}{Y_0}+\dots+\frac{\sum Y}{AY_0} \quad (9)$$

and at the frequency of tuning $$\frac{1}{A'_0}=\frac{\sum Y}{AY_0}+\frac{K_3Y_3}{Y_0}+\dots \quad (10)$$

To illustrate the foregoing let it be assumed that an amplifier is to be designed in which the curves of FIG. 4 are straight lines, as in FIG. 3, and the maximum gain and Q are to be constant, i.e. lines $1/A'_0$ and 42 are to be straight, horizontal lines.

Since $$\frac{K_1\beta_1}{\alpha}$$

is equal to the ratio of $K_1Y_1$ to $Y_0$, and since it is desired that $$\frac{K_1\beta_1}{\alpha}$$

be a straight line with a slope of +1, the curves $K_1Y_1$ and $Y_0$ may be arbitrary provided they have a slope difference of +1 at every frequency. Similarly, in order that $$\frac{K_2\beta_2}{\alpha}$$

be a straight line having a slope of −1, the curves $K_2Y_2$ and $Y_0$ may be arbitrary provided they have a slope difference of −1 at every frequency. This provides a slope difference of 2 between the curves, and a phase difference of 180° between $$\frac{K_1\beta_1}{\alpha}$$

and $$\frac{K_2\beta_2}{\alpha}$$

In like manner, since $$\frac{1}{A'_0}$$

is equal to the ratio of $$\frac{\Sigma Y}{A}+K_3Y_3+\ldots$$

to $Y_0$ and since it is desired that $$\frac{1}{A'_0}$$

be a horizontal straight line, the curve of $$\frac{\Sigma Y}{A}+K_3Y_3+\ldots$$

must have the same slope as that of $Y_0$ at every frequency. Thus, for the present illustration the specification of the curve for $Y_0$ also specifies the curves for $K_1Y_1$, $K_2Y_2$ and $$\frac{\Sigma Y}{A}+K_3Y_3+\ldots$$

The requirement for the curve for $$\frac{\Sigma Y}{A}+K_3Y_3+\ldots$$

can be met by making the curve for each term $$\frac{\Sigma Y}{A}$$

$K_3Y_3$, etc. have the slope as that of $Y_0$ at every frequency, as illustrated in FIG. 6.

Alternatively, if the value of $$\frac{\Sigma Y}{A}$$

is made sufficiently small throughout the frequency range, the shape of its curve becomes unimportant. Accordingly, it is necessary merely to insure that the curve for $K_3Y_3+\ldots$ has the same slope as that of the curve for $Y_0$ at every frequency. In this instance, therefore, the design requirements for the amplifier are simplified considerably, since it is only the orders of magnitude of the value of A and the values of $Y_a$, $Y_c$, $Y_e$, $Y_g$, $Y_i$, etc. that are significant and not their exact value.

The circuit for FIG. 7*a*, consisting of the series combination of a capacitance 44 and a resistance 46, can be recognized as having an admittance curve of the shape shown for $Y_0$ in FIG. 6. The circuit of FIG. 7*b* comprises a T network of a pair of capacitors 48 and 50 connected in series between the ends of the T, and a resistor 52 connecting the junction between the capacitors to the common conductor of the amplifier circuit, shown as ground. This circuit can be shown to have a pi equivalent circuit in which the direct admittance between the ends of the pi network is of the type shown for $K_1Y_1$ in FIG. 6. The circuit of FIG. 7*c* comprises a T network of a pair of resistors 54 and 56 connected in series between ends of the T, and a capacitor 58 connecting the junction between the resistors to the common conductor of the amplifier circuit. This circuit can be shown to have a pi equivalent circuit in which the direct admittance between the ends of the pi network is of the type shown for $K_2Y_2$ in FIG. 6. The circuit of FIG. 7*d*, consisting of the series combination of an inductance 60 and a resistance 62, is an alternative circuit for FIG. 7*c*. The resistance may be either a separate resistor, as shown, or the winding resistance of the inductor, or a combination thereof.

Each of the curves shown in FIG. 6 is characterized by an approach to a pair of intersecting straight line asymptotes illustrated by the dash lines. The components of the circuits in FIGS. 7*a*, 7*b*, 7*c* and 7*d* are selected so that intersections of the pairs of asymptote lines are at the same frequency, as indicated by the dot and dash line. It is by this means that the foregoing slope and phase difference requirements are met. It is to be understood that the frequency identified by the dot and dash line is an arbitrary design constant for the circuits of FIGS. 7*a*–7*d* and is not related to the frequency of tuning.

As previously stated, it is also to be assumed for the illustrated amplifier design that the Q is to remain essentially constant over the range of tuning. Therefore, the product $K_1K_2$ also must be substantially constant. This condition can be adequately approximated by the use of attenuators of the types illustrated in FIGS. 8*a*, 9*a*, and 10*a*.

The differential attenuator of FIG. 8*a* comprises a variable tapped resistor 64 whose variable tap 66 serves as the common signal junction, and load resistors 68 and 70 connecting the opposite ends of the variable resistor to the common circuit conductor, herein designed ground. The variable tap is movable across the variable resistor, through the distance $\theta$ indicated in FIG. 8*b*. The values of the load resistors are selected to provide the range of transmission factors $K_1$ and $K_2$ required to produce the desired range for the frequency of tuning. The degree of constancy of the product $K_1K_2$, illustrated by the curve in FIG. 8*b*, will vary with the range of attenuation required.

The attenuator of FIG. 9*a* differs from that of FIG. 8*a* in the provision of a third load resistor 72 connecting an intermediate fixed point on the variable resistor to the common conductor. The values of the load resistors 68, 70, 72 are chosen to enhance the constancy of the product $K_1K_2$ over a given tuning range, or to expand the tuning range for a required degree of constancy. This is illustrated by the curve in FIG. 9*b*. Additional load resistors connected to other intermediate fixed points on the variable resistor will improve still further the constancy or range.

The attenuator of FIG. 10*a* differs from that of FIG. 8*a* in the provision of the resistor 74 connected in series with the variable tap. The values of the resistors 68, 70 and 74 are chosen to improve the constancy of the product $K_1K_2$ over a given tuning range, or to expand the tuning range for a required degree of constancy. The curve shown in FIG. 10*b* illustrates this improvement.

Resistor 74 may be utilized in the circuit of FIG. 9*a* to improve still further the constancy or range thereof.

It is to be noted that for any design in which the slopes of $$\frac{K_1\beta_1}{\alpha}$$

and $$\frac{K_2\beta_2}{\alpha}$$

differ by 2, the frequency of tuning determined by the point of intersection of the curves will vary in proportion to the square root of $K_2/K_1$. In the attenuators described hereinbefore the logarithms of the K's vary approximately linearly with the setting $\theta$, as illustrated in FIGS. 8*b*, 9*b* and 10*b*. Accordingly, a linear variation in the setting of the tap on the variable resistor will produce an approximately logarithmic variation in $K_2/K_1$ and therefore a substantially logarithmic frequency scale.

Referring now to FIG. 11 of the drawings, there is shown a typical circuit arrangement for the amplifier of the present invention. The common input and output terminals 76 and 78 are connected to the common conductor of the amplifier circuit, herein shown as ground. The other input terminal 80 is connected through the circuit of FIG. 7*a* to the input of the basic amplifier 14, to provide the aforementioned input signal modifying means 32 in which the signal modification is described by the complex vector quantity $\alpha$.

One of the pair of feedback paths includes the circuit of FIG. 7*b*, to provide the signal modifying means 22 in which the signal modification is described by the complex vector quantity $\beta_1$.The other of the pair of feedback paths includes the circuit of FIG. 7*c* which provides the signal modifying means 24 in which the signal modification is described by the complex vector quantity $\beta_2$. These two feedback paths are completed through the differential attenuator circuit of FIG. 9*a* which provides the transmission factors $K_1$ and $K_2$.

The auxiliary feedback path illustrated includes the elements 44' and 46' in the circuit arrangement of FIG. 7*a*, providing the signal modifying means in which the signal modification is described by the complex vector quantity $\beta_3$ having the same frequency characteristics as $\alpha$ but not necessarily the same impedance level. This auxiliary feedback path also may include an attenuator, such as the variable tapped resistor 84, connected as a divider, to provide a signal level adjusting means in which the transmission factor is described by the quantity $K_3$.

It will be understood that the values of the elements of the attenuators in FIG. 11 must be sufficiently low to minimize magnitude changes and phase shifts in the attenuators caused by loading of the latter by the signal modifying circuits. Alternatively, isolation amplifiers can be inserted between the attenuators and the signal modifying circuits to minimize loading effects.

It will be apparent to those skilled in the art that various changes in circuit arrangements and components and other details described hereinbefore may be made without departing from the spirit of this invention and the scope of the appended claims.

Having now described my invention and the manner in which it may be used, what I claim as new and desire to secure by Letters Patent is:

1. A frequency selective amplifier of the feedback type having means for selecting a response curve, the amplifier comprising (a) a basic amplifier, (b) an input signal path connected to the input of the basic amplifier for transmitting an input signal to the input of the basic amplifier, (c) a pair of feedback signal paths connected between the output and the input of the basic amplifier for transmitting the output signal back to the input of the basic amplifier, (d) signal modifying means in a least one of the feedback paths providing relative phase shifts in the feedback paths which differ from each other by substantially 180° at all frequencies in the tuning range, (e) signal modifying means in the input signal path providing magnitude characteristics relative to the magnitude characteristics of the signal modifying means in the feedback paths over an extended frequency range above and below the frequency of tuning such that the ratio between the magnitude characteristics of the input path and those of each of the pair of feedback paths provides a pair of intersecting curves having the desired shapes for the high and low frequency asymptotes, respectively, of the selected response curve, and (f) signal level adjusting means in at least one of the feedback paths operable to place the intersection of said curves at the frequency and magnitude level for the selected response curve.

2. The amplifier circuit of claim 1 including at least one auxiliary feedback path including signal modifying means providing an auxiliary feedback signal operable to control the gain of the frequency selective amplifier at the frequency of tuning.

3. The amplifier circuit of claim 2 including signal level adjusting means in the auxiliary feedback path operable to vary the gain of the frequency selective amplifier at the frequency of tuning.

4. The amplifier circuit of claim 1 wherein the signal modifying means in the input signal path has an equivalent direct admittance which is characterized in a graphic plot of the logarithm of said admittance versus the logarithm of frequency by a curve exhibiting a slope which differs from that of the equivalent direct admittance of each of the said pair of feedback paths by substantially one at every frequency within the range of tuning.

References Cited

UNITED STATES PATENTS

| | | | |
|---|---|---|---|
| 2,173,426 | 9/1939 | Scott | 330—109 X |
| 2,173,427 | 9/1939 | Scott | 330—109 X |
| 2,441,567 | 5/1948 | Darlington | 330—109 X |
| 2,672,529 | 3/1954 | Villard | 330—104 X |

OTHER REFERENCES

Butler: "Transistor R-C Oscillators and Selective Amplifiers," Wireless World, December 1962, pp. 583–589.

Taylor: "Transistors in Parallel-T," Radio-Electronics, January 1961, page 38.

ROY LAKE, *Primary Examiner.*

NATHAN KAUFMAN, *Examiner.*

J. B. MULLINS, *Assistant Examiner.*